United States Patent [19]
Matsuno et al.

[11] Patent Number: 5,143,437
[45] Date of Patent: Sep. 1, 1992

[54] VEHICLE ROOM ILLUMINATING APPARATUS

[75] Inventors: Yohsio Matsuno; Shinichiro Choji, both of Machida; Kenichi Sasaki, Neyagawa; Yoshinori Tanabe, Hirakata, all of Japan

[73] Assignees: Nissan Motor Co., Ltd., Yokohama; Matsushita Electric Industrial Co., Ltd., Osaka, both of Japan

[21] Appl. No.: 538,333

[22] Filed: Jun. 15, 1990

[30] Foreign Application Priority Data

Jun. 26, 1989 [JP] Japan .................. 1-164457

[51] Int. Cl.$^5$ .............................. B60Q 3/00
[52] U.S. Cl. ........................ 362/80; 362/74; 362/295; 362/802; 315/77; 315/156
[58] Field of Search ............ 362/61, 80, 74, 75, 362/153, 295, 802; 315/77, 156, 157, 158, 159

[56] References Cited

U.S. PATENT DOCUMENTS

| | | | |
|---|---|---|---|
| 2,635,681 | 4/1953 | Hiltman | 362/131 |
| 2,783,365 | 2/1957 | Wilfert | 362/80 |
| 2,882,450 | 4/1959 | McCabe | 315/158 |
| 4,217,628 | 8/1980 | Windom | 362/131 |
| 4,231,082 | 10/1980 | Bull | 362/80 |
| 4,236,101 | 11/1980 | Luchaco | 315/156 |
| 4,388,558 | 6/1983 | Mizuno et al. | 315/77 |
| 4,670,819 | 6/1987 | Boerema et al. | 362/80 |

FOREIGN PATENT DOCUMENTS 0011431 1/1990 Japan .................. 362/833

Primary Examiner—Stephen F. Husar
Attorney, Agent, or Firm—Foley & Lardner

[57] ABSTRACT

The brightness within a vehicle room is adjusted according to external brightness (i.e. illuminance or luminance) at night in such a way that the brightness is increased with increasing external brightness and decreased with decreasing external brightness, under due consideration of human eye adaptation to external lightness and darkness. Therefore, the passenger can read a book, for instance, at roughly a constant visual sensitivity, without being subjected to the influence of change in external illuminance or luminance.

19 Claims, 4 Drawing Sheets

VEHICLE ROOM ILLUMINATING APPARATUS

BACKGROUND OF THE INVENTION

1. Field of the Invention

The present invention relates to a vehicle room illuminating apparatus for illuminating a vehicle room of a passenger car, for instance.

2. Description of the Prior Art

Some examples of prior-art vehicle room illuminating apparatus will be explained with reference to FIGS. 1(A) to (C).

FIG. 1(A) shows a first example, in which a vehicle room 11 of a passenger car 4 is illuminated for passengers 5 and 6 by a room light 12 attached at roughly the center of a vehicle ceiling 13. An example of the room light 12 is disclosed in Japanese Published Unexamined (Kokai) Utility Model Appli. No. 54-3759, for instance. The room light 12 is entirely or partially covered by a light transmissible material such as resin so that the room light 12 can illuminate the vehicle room 11. In this first prior-art example, since the room light 12 is usually turned on or off with a switch, the vehicle room 11 is illuminated only when the light 12 is turned on manually at night or automatically when one of vehicle doors is open even in the day time.

In the above-mentioned prior-art illuminating apparatus, however, since the brightness of the room light 12 is kept constant irrespective of change in external brightness (i.e. illuminance or luminance), when the vehicle is running at night or in the evening along a bright shopping street or district where a number of bright roadside lamps are arranged or window illumination brightness is high long along a street, there exists a problem in that it is difficult for the passenger to well see an object such as a book even when the room light 12 is turned on. This is because the human eyes are gradually adapted to the bright external environment (called light adaptation). In other words, human eyes' visual sensitivity decreases with increasing external illuminance or luminance in a field of vision. In the above case, it has been necessary to further turn on an additional room lamp to increase brightness within the vehicle room.

On the other hand, when the vehicle is running at night long along a dark road, there exists a problem in that the passenger feels that the vehicle room is excessively illuminated and therefore dazzled. This is because the human eyes are gradually adapted to the dark external environment (called dark adaptation). In other words, human eyes' visual sensitivity increases with decreasing external illuminance or luminance in a field of vision.

FIG. 1(B) shows an example of prior-art clock display panel illuminating apparatus, in which a digital clock 14 having a display panel 15 is illuminated in such a way that the display panel brightness can be adjusted automatically according to the external brightness. That is, when the head lamps are turned off in the daytime, the brightness of this digital clock display panel is automatically adjusted higher than when the head lamps are turned on at night. This is because it is possible to allow the display panel 15 of the digital clock 14 to be well visible even in the daytime according to the adaptation of the passenger's eyes.

FIG. 1(C) shows an example of the prior-art head lamp adjusting apparatus, which comprises an external brightness sensor 16, a head lamp controller 17 for turning on or off head lamps 18 in response to signals generated from the sensor 16, and a power supply section 19 for supplying power to the head lamps 18 via the head lamp controller 17. In this third example, when the sensor 16 detects dark external environment as when the vehicle 4 comes into a tunnel, and therefore generates a lamp turn-on signal to the controller 17, the controller 17 automatically turns on the head lamps 18. On the other hand, when the sensor 16 detects bright external environment as when the vehicle 4 goes out of a tunnel and therefore generates a lamp turn-off signal to the controller 17, the controller 17 automatically turns off the head lamps 18. In this example, since the head lamps 18 are turned on or off automatically according to the external brightness, it is possible to prevent the head lamps 18 from being left turned on or off carelessly or by mistake.

In the above-mentioned second and third examples, although the illumination devices (clock display or head lamps) can be adjusted according to the external brightness, the brightness of the devices are not adjusted finely in analog fashion or multistep digital fashion under due consideration of the dark and light adaptation of the drivers' or passengers' eyes. In addition, the above-mentioned prior-art apparatus are not directly related to the vehicle room illuminating apparatus.

SUMMARY OF THE INVENTION

With these problems in mind, therefore, it is the primary object of the present invention to provide a vehicle room illuminating apparatus which can automatically adjust brightness within a vehicle room according to the dark or light adaptation level of the driver's or passenger's eyes.

To achieve the above-mentioned object, the vehicle room illuminating apparatus for an automotive vehicle, according to the present invention, comprises: (a) illuminating means for illuminating a vehicle room; (b) optical sensing means for sensing external brightness; and (c) controlling means responsive to said sensing means, for adjustably illuminating the vehicle room under consideration of human eye adaptation to the external brightness. In practice, the brightness in the vehicle room is increased with increasing external brightness and decreased with decreasing external brightness at night.

The illuminating means is at least one foot lamp, room lamp, reading lamp, etc. The sensing means senses road surface luminance or external brightness without being subjected to influence of the vehicle room illuminating means.

Further, instantaneous external brightness for a predetermined period of time (e.g. one minute) is sensed, averaged to obtain external brightness data, and further classified into a plurality of grades (e.g. five grades) to adjust the brightness within the vehicle room according to the classified external brightness grades.

In the vehicle room illuminating apparatus for an automotive vehicle according to the present invention, since the brightness within the vehicle room can be adjusted according to the external brightness (i.e. external illuminance or luminance) at night in such a way that the brightness within a vehicle room can be increased with increasing external brightness and decreased with decreased external brightness, under due consideration of human eye adaptation to external lightness and darkness, it is possible to allow the passenger to read a book or a map, for instance at roughly a constant visual sensitivity, without being subjected to the influence of change in external illuminance or luminance.

DETAILED DESCRIPTION OF THE PREFERRED EMBODIMENTS

An embodiment of the vehicle room illuminating apparatus according to the present invention will be described hereinbelow with reference to the attached drawings.

Figure 1A:
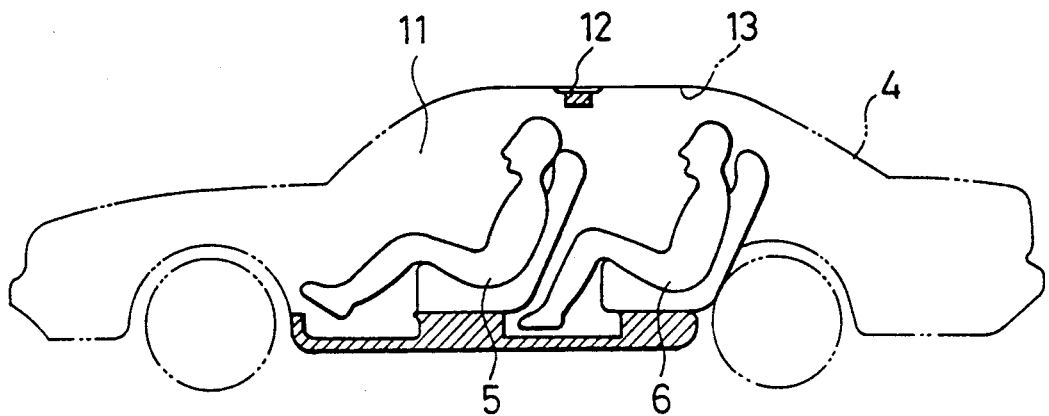
FIG. 1(A) is a diagrammatical illustration for assistance in explaining a first example of prior-art vehicle room illuminating apparatus by a room lamp.
Figure 1B:
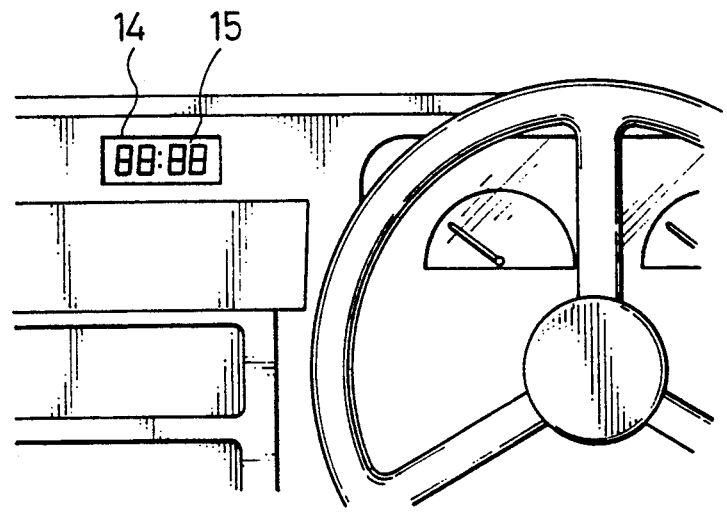
FIG. 1(B) is a diagrammatical illustration for assistance in explaining a second example of prior-art vehicle clock illuminating device.
Figure 1C:
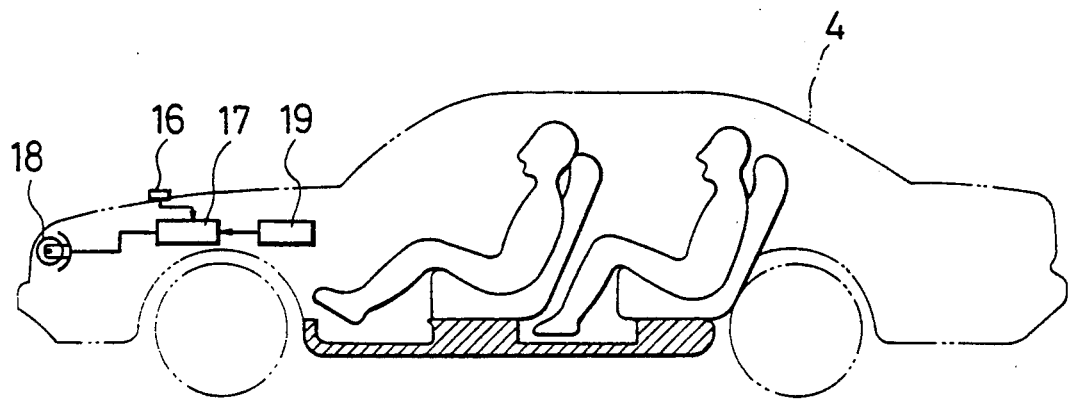
FIG. 1(C) is a diagrammatical illustration for assistance in explaining a third example of prior-art automatic head lamp turning-on or -off apparatus.
Figure 2:
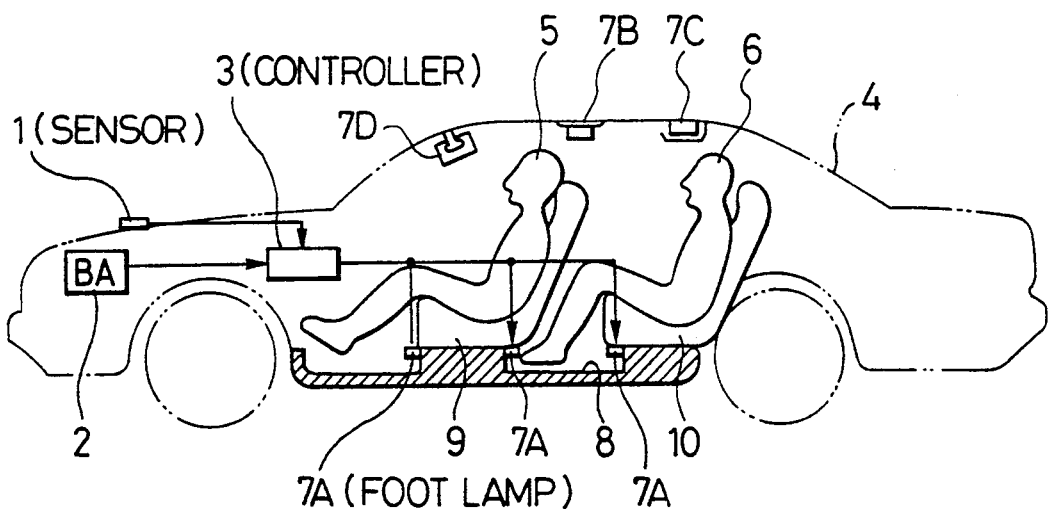
FIG. 2 is a diagrammatical illustration showing an embodiment of the vehicle room illuminating apparatus according to the present invention.

FIG. 2 shows an embodiment of the apparatus according to the present invention, which comprises an optical sensor 1, a battery 2, a light controller 3, and three foot lamps 7A. Further, in FIG. 2, a vehicle 4 is provided with a vehicle room floor 8, a front seat 9 for a driver 5, and a rear seat 10 for passengers 6.

The optical sensor 1 detects external brightness such as external illuminance (1X) or external luminance ($cd/m^2$) in front of or on side of the vehicle 4. Here, the illuminance (1X) implies luminous flux (1 m) (optical energy passing per unit time) per unit area ($m^2$), and the luminance ($cd/m^2$) implies luminous intensity (cd) (optical energy passing through unit solid angle per unit time) per unit area ($m^2$).

In response to signals detected by the optical sensor 1, the light controller 3 controls the brightness of the foot lamps 7 in such a way that the brightness of the foot lamps 7 increases with increasing road surface luminance and decreases with decreasing road surface luminance detected by the optical sensor 1.

As described above, the illumination level of the foot lamps 7 is increased with increasing external brightness or decreased with decreasing external brightness such as external luminance on the road or illuminance in front of or on side of the vehicle. The above effect will be explained hereinbelow with reference the attached drawings in further detail below.

Figure 3A:
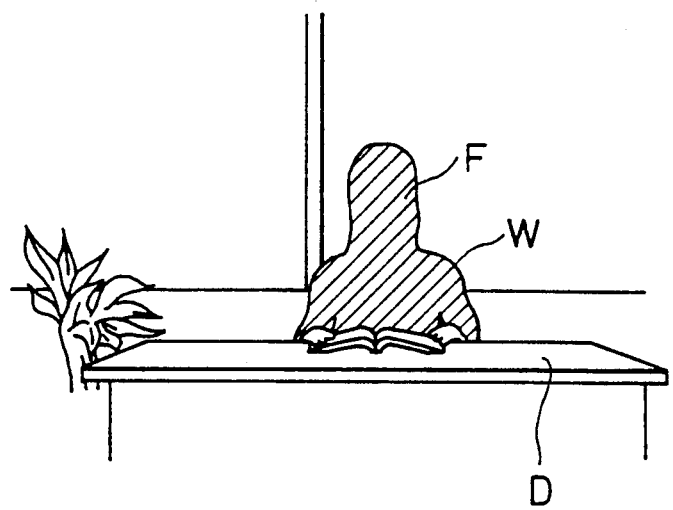
FIGS. 3(A) and (B) are illustrations for assistance in explaining difference in human eyes' visual sensitivity according to dark or light adaptation.
Figure 3B:
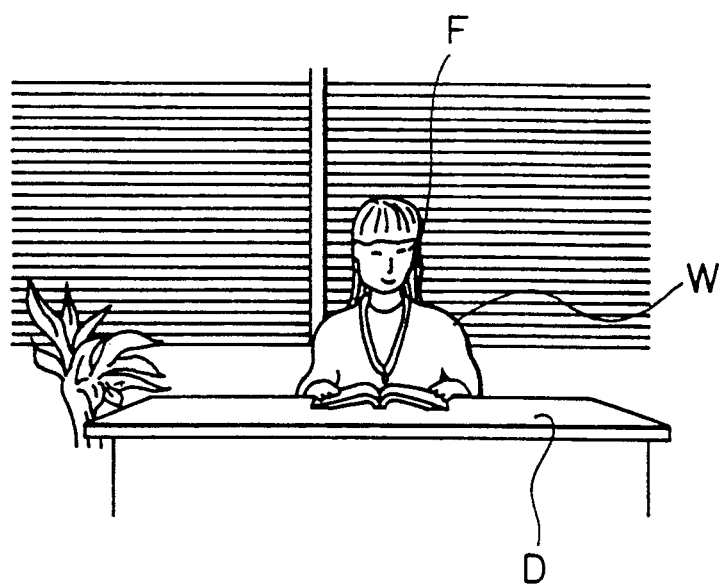

FIGS. 3(A) and (B) show an example of phenomenon that physical or absolute brightness of an object to be seen by an observer does not necessarily accord with the sense of human "brightness". The assumption is made that the brightness of a face F of a woman W taking a seat at a desk D is equivalent (e.g. 60 $cd/m^2$) in both the drawings. However, the face F of the woman W looks dark before a bright background as shown in FIG. 3(A), but bright before a dark background as shown in FIG. 3(B). This is because the sensitivity of human eyes is not kept constant but adjusted according to the environment so that the human eyes can see objects in a wide visual environment from dark outdoor at night to bright outdoor in the daytime. That is, when the brightness in the visual field is low in dark outdoor at night, the eye sensitivity increases so as to sense a dark object; however, when high in bright outdoor in the daytime, the eye sensitivity decreases so as to prevent the optic nerve from being stimulated excessively. Therefore, as shown in FIGS. 3(A) and 3(B), the woman's faces with the same brightness are visible differently in two different environments according the brightness of the visual field or according to the sensitivity of the human eyes. The same phenomenon as described above occurs within the vehicle room. Therefore, it is preferable to adjust the vehicle room illumination level according to the external brightness (illuminance or luminance) around the vehicle.

On the other hand, the brightness on roads is standardized in Japan as Japanese Standard of Road Luminance by Japanese Road Association, as shown in Table 1 below.

TABLE 1

| Japanese Standard of Road Luminance | | | |
|---|---|---|---|
| | EXTERNAL CONDITIONS | | |
| ROAD CLASSIFICATION | A | B | C |
| SPEEDWAYS | 1.0 | 1.0 | 0.7 |
| NATIONAL ROADS | | | |
| MAIN TRUNK ROADS | 1.0 | 0.7 | 0.5 |
| TRUNK OR AUX TRUNK ROADS | 0.7 | 0.5 | 0.5 |

Unit: ($cd/m^2$)

In the above table 1, roads are classified into three groups under consideration of road construction conditions and traffic conditions; an average road surface luminance is determined according to each of the three classified roads; and the brightness is further classified into three values under consideration of road environment conditions, where A denotes bright external conditions, B denotes medium external conditions, and C denotes dark external conditions. In addition, with respect to important roads or special roads, this standard prescribes that it is possible to further increase the listed brightness by 2 ($cd/m^2$) at the maximum. In summary, the above-mentioned Japanese standard of luminance can be classified into five grades of (1) 0 to 0.5; (2) 0.5 to 0.7; (3) 0.7 to 1.0 (4) 1.0 to 2.0; and (5) 2.0 or more ($cd/m^2$) according to road conditions, traffic conditions, external environment conditions, etc.

Figure 4:
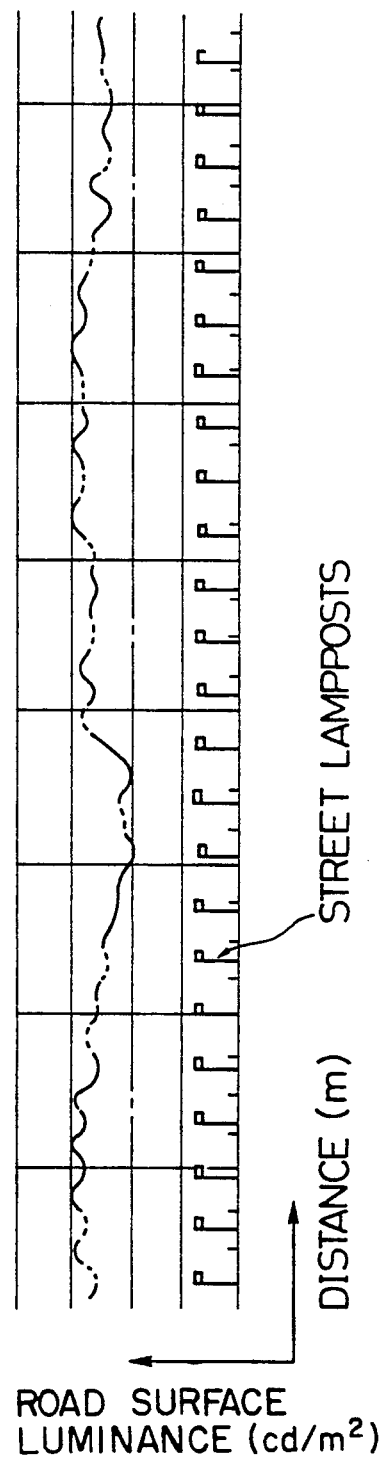
FIG. 4 is a graphical representation showing an example of variation in road surface luminance obtained by continuously measuring the front visual field of a person taking a vehicle front seat.

FIG. 4 shows an example of actual brightness on a road surface in the front visual field measured by a person taking the front seat 9 of the vehicle 4 when the vehicle is running along a road where a plurality of street lamp posts P are arranged at intervals. This graphical representation indicates that the road surface luminance changes markedly being subjected to the influence of the intervals between the two street lighting apparatus, change in reflectivity on the road surface, etc.

In the illuminating apparatus according to the present invention, road surface brightness as shown in FIG. 4 is detected by the optical sensor 1 and then an average road surface luminance for one minute for instance is calculated by the controller 3, because the eyes of the driver 5 and the passengers 6 watching frontward are adapted to the average road surface luminance on the frontward road of the vehicle. Therefore, the illumination level of the foot lamps 7 is adjusted according to the average road surface luminance thus obtained.

In practice, for instance in this embodiment, five illumination level grades are determined as Grade 1, when the average road surface luminance B for one minute detected by the optical sensor 1 is $0 < B \leq 0.5$ (cd/m$^2$); Grade 2, when $0.5 < B \leq 0.7$ (cd/m$^2$); Grade 3, when $0.7 < B \leq 1.0$ (cd/m$^2$); Grade 4, when $1.0 < B \leq 2.0$ (cd/m$^2$), and Grade 5, when $2.0 < B$ (cd/m$^2$).

Our experiments have indicated that the human eyes can see an object under the same brightness condition obtained when the illuminance measured at the rear middle portion on the vehicle room floor 8 (at the rear passenger's feet) is kept at about 20 (1×) in the pitch-dark environment as when the same illuminance is kept at about 110 (1×) in the brightest road (2.0 cd/m$^2$) environment. On the basis of the above-mentioned experiments, in the present invention, the illuminance of the foot lamps 7 is adjusted to 20 (1×) at Grade 1 ($0 < L_r \leq 0.5$), 40 (1×) at Grade 2 ($0.5 < L_r \leq 0.7$), 70 (1×) at Grade 3 ($0.7 < L_r \leq 1.0$), 110 (1×) at Grade 4 ($1.0 < L_r \leq 2.0$), and 160 (1×) at Grade 5 ($2.0 < L_r$), according to the road surface luminance $L_r$ in front of the vehicle.

Further, in the present embodiment, since a plurality of foot lamps 7 are arranged on the vehicle floor 8, it is possible to prevent such an impression that the driver 5 taking the front seat 9 and the passengers 6 taking the rear seat 10 feel extremely dark at night when they see the room floor, and further to provide such an impression that the passengers 6 feel broad at passengers' feet by lighting up the foot lamps 7A, irrespective of change in external brightness.

Further, in the above-mentioned embodiment, the foot lamps 7A are arranged on the vehicle room floor by way of example. Without being limited thereto, however, it is also possible to obtain the similar effect by mounting other lamps within the vehicle room, for instance such as another room lamp 7B attached to the vehicle ceiling to directly illuminate the vehicle room, another room lamp 7C attached in the same way to indirectly illuminate the vehicle room, a movable reading lamp 7D disposed within the vehicle room to illuminate the position near the passenger hand. Further, the frontward road surface luminance is detected by the optical sensor 1 in the above-embodiment, without being limited thereto, however, it is also possible to detect the external illuminance on the side or around the vehicle 4 to adjust the internal illuminance within the vehicle 4.

As described above, in the vehicle room illuminating apparatus according to the present invention, since the internal illumination level within the vehicle room can be adjusted according to the external illuminance or luminance at night, it is possible to illuminate the vehicle room so that the passenger can see an object within the vehicle room at roughly a constant visual sensitivity, under due consideration of the passengers' eye light and dark adaptation, irrespective of change in external illuminance or luminance in front of or around the vehicle.

What is claimed is:

1. A vehicle room illuminating apparatus for an automotive vehicle, comprising:
   (a) illuminating means for illuminating a vehicle room;
   (b) optical sensing means for sensing external brightness; and
   (c) controlling means responsive to said optical sensing means, for adjustably illuminating the vehicle room under consideration of human eye adaptation to the external brightness.

2. The vehicle room illuminating apparatus of claim 1, wherein brightness in the vehicle room is increased with increasing external brightness and decreased with decreasing external brightness at night.

3. The vehicle room illuminating apparatus of claim 1, wherein said illuminating means is at least one foot lamp disposed on a vehicle room floor.

4. The vehicle room illuminating apparatus of claim 3, wherein three foot lamps are disposed in front and rear of a front seat and in front of a rear seat.

5. The vehicle room illuminating apparatus of claim 1, wherein said illuminating means is a room lamp attached to a vehicle ceiling to directly illuminate the vehicle room.

6. The vehicle room illuminating apparatus of claim 1, wherein said illuminating means is a ceiling lamp attached to a vehicle ceiling to indirectly illuminate the vehicle room.

7. The vehicle room illuminating apparatus of claim 1, wherein said illuminating means is at lest one movable reading lamp disposed within a vehicle room to directly illuminate a position near passenger hand.

8. The vehicle room illuminating apparatus of claim 1, wherein said optical sensing means senses road surface brightness without being subjected to influence of said vehicle room illuminating means.

9. The vehicle room illuminating apparatus of claim 1, wherein said optical sensing means senses external brightness without being subjected to influence of said vehicle room illuminating means.

10. The vehicle room illuminating apparatus of claim 1, wherein said optical sensing means senses instantaneous external brightness for a predetermined period of time, and said controlling means calculates an average of the sensed external brightness as data for illuminating the vehicle room.

11. The vehicle room illuminating apparatus of claim 10, wherein said predetermined period of time is one minute.

12. The vehicle room illuminating apparatus of claim 11, wherein the sensed and averaged external optical intensity data are classified into a plurality of grades, and said controlling means illuminates the vehicle room at a plurality of different room luminous intensities on the basis of the averaged and classified external brightness grades.

13. The vehicle room illuminating apparatus of claim 12, wherein the sensed and averaged external intensity data are classified into five grades, and said controlling means illuminates the vehicle room at five different room brightnesses.

14. The vehicle room illuminating apparatus of claim 13, wherein the room brightness is adjusted to 20 1× when the average front road surface luminance $L_r$ for one minute is $0 < L_r \leq 0.5$ cd/m$^2$; 40 1× when $0.5 < L_r \leq 0.7$ cd/m$^2$; 70 1× when $0.7 < L_r \leq 1.0$ cd/m$^2$, 110 1× when $1.0 < L_r \leq 2.0$ cd/m$^2$; and 160 1× when $2.0 < L_r$ cd/m$^2$.

15. A method of illuminating a vehicle room at night, comprising the steps of:
    (a) sensing external brightness; and (b) illuminating the vehicle room in such a way that brightness in the vehicle room increases with increasing external brightness and decreases with decreasing external brightness.

16. The method of illuminating a vehicle room of claim 15, wherein the step of sensing external brightness comprises the steps of:
   (a) sensing instantaneous external brightness; and
   (b) averaging the sensed instantaneous external brightness for a predetermined period of time; and
   (c) classifying the averaged external brightness into a plurality of grades.

17. The method of illuminating a vehicle room of claim 16, wherein the vehicle room is illuminated at a plurality of different brightness grades according to the classified external brightness grades.

18. A vehicle room illuminating apparatus for an automotive vehicle, comprising:
   (a) illuminating means for illuminating a vehicle room;
   (b) optical sensing means for sensing instantaneous external brightness for a predetermined period of time without being subjected to influence of said vehicle room illuminating means; and
   (c) controlling means responsive to said optical sensing means, for calculating an average of the sensed instantaneous external brightness and adjustably illuminating the vehicle room on the basis of the calculated average brightness under consideration of human eye adaptation to the external brightness in such a way that brightness in the vehicle room is increased with increasing external brightness and decreased with decreasing external brightness at night.

19. A method of illuminating a vehicle room at night, comprising the steps of:
   (a) sensing instantaneous external brightness;
   (b) averaging the sensed instantaneous external brightness for a predetermined period of time;
   (c) classifying the averaged external brightness into a plurality of grades; and
   (d) illuminating the vehicle room in such a way that brightness in the vehicle room increases with increasing external brightness and decreases with decreasing external brightness at a plurality of different brightness grades according to the classified external brightness grades.

* * * * *